(12) United States Patent
Kanaya et al.

(10) Patent No.: US 8,973,845 B2
(45) Date of Patent: Mar. 10, 2015

(54) AIR CONDITIONING APPARATUS WITH A CONTROLLER THAT UTILIZES TWO SET TEMPERATURE RANGES

(75) Inventors: Osamu Kanaya, Tokyo (JP); Taro Hattori, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 561 days.

(21) Appl. No.: 13/208,840

(22) Filed: Aug. 12, 2011

(65) Prior Publication Data

US 2012/0097748 A1    Apr. 26, 2012

(30) Foreign Application Priority Data

Oct. 26, 2010    (JP) .................................. 2010-239375

(51) Int. Cl.
| F01P 7/02 | (2006.01) |
| F24F 11/04 | (2006.01) |
| F28F 27/00 | (2006.01) |
| F24F 7/00 | (2006.01) |

(Continued)

(52) U.S. Cl.
CPC ........... *F24F 1/0014* (2013.01); *F24F 11/0012* (2013.01); *F24F 11/0078* (2013.01); *F24F 11/0079* (2013.01); *F24F 2001/0037* (2013.01); *F24F 2011/0045* (2013.01); *F24F 2011/0068* (2013.01); *F24F 2013/0616* (2013.01); *Y02B 30/746* (2013.01)
USPC ................ 236/49.3; 62/186; 62/177; 236/35; 236/38; 237/2 A

(58) Field of Classification Search
USPC .................... 62/177, 185, 186, 408, 409, 411; 165/53, 54, 122; 236/35, 49.3, 38; 237/2 A
See application file for complete search history.

(56) References Cited

U.S. PATENT DOCUMENTS 4,733,719 A * 3/1988 Levine ........................... 165/238
4,782,999 A * 11/1988 Ishii et al. ..................... 236/49.3

(Continued)

FOREIGN PATENT DOCUMENTS

| JP | 61-223448 A | 10/1986 |
| JP | 2002-22244 A | 1/2002 |

(Continued)

OTHER PUBLICATIONS

A machine translation for Japanese Publication No. JP 2004-150731 is provided. The file is named JP2004-150731.*

(Continued)

*Primary Examiner* — Alexandra Elve
*Assistant Examiner* — Paul Alvare
(74) *Attorney, Agent, or Firm* — Buchanan Ingersoll & Rooney PC

(57) ABSTRACT

An air-conditioning apparatus includes a temperature sensor for detecting a heat exchanger temperature or an inlet air temperature, a controller that performs variable control of the direction of the indoor unit air blow vane or the air flow speed or rate of the blower fan, and a remote controller that remote-controls indoor unit operation, wherein temperatures set via the remote controller are divided into two set temperature ranges and during heating operation the controller sets at least the air blow vane to a horizontal or downward direction on the basis of the two set temperature ranges and the heat exchanger temperature or the inlet air temperature.

5 Claims, 4 Drawing Sheets

(51) Int. Cl.
B60H 1/03 (2006.01)
B60H 1/00 (2006.01)
B60H 1/22 (2006.01)
F25D 17/04 (2006.01)
F25D 17/00 (2006.01)
F24F 1/00 (2011.01)
F24F 11/00 (2006.01)
F24F 13/06 (2006.01)

(56) References Cited

U.S. PATENT DOCUMENTS 4,966,009 A * 10/1990 Ishii et al. .................. 62/160
4,969,508 A * 11/1990 Tate et al. ................. 165/209
5,072,878 A * 12/1991 Aoki et al. .................. 236/38
5,833,134 A * 11/1998 Ho et al. ................. 236/49.3
5,921,099 A * 7/1999 Lee .......................... 62/228.4
6,079,219 A * 6/2000 Katsuki ...................... 62/180

FOREIGN PATENT DOCUMENTS

| JP | 2004-150731 A | | 5/2004 |
| JP | 2004150731 A | * | 5/2004 |
| JP | 2008-101874 A | | 5/2008 |

OTHER PUBLICATIONS

Office Action (Notice of Reasons for Rejection) dated Sep. 25, 2012, issued in corresponding Japanese Patent Application No. 2010-239375, and an English Translation thereof. (5 pages).

* cited by examiner

F I G. 1
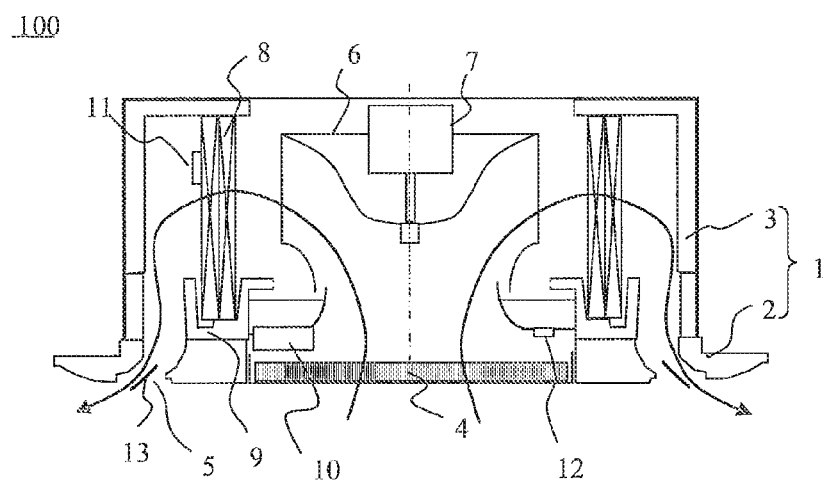
F I G. 2
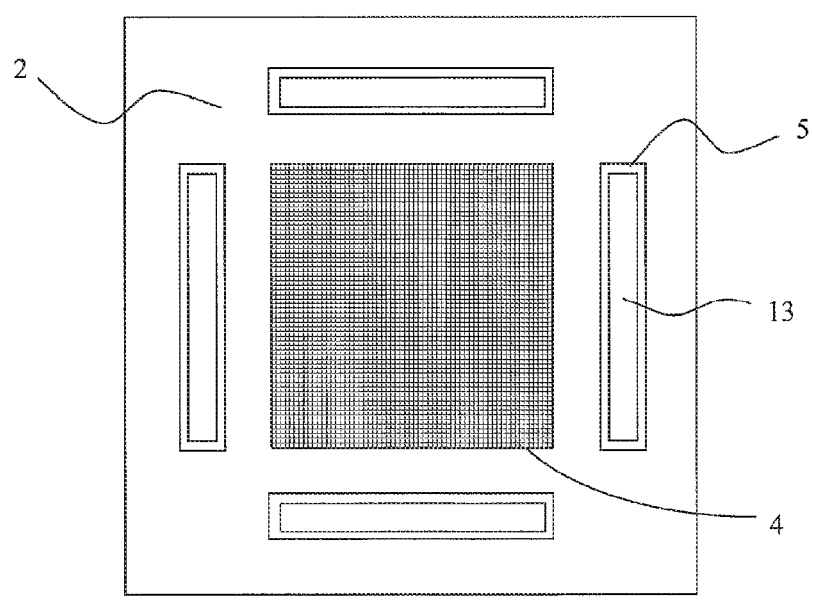

AIR CONDITIONING APPARATUS WITH A CONTROLLER THAT UTILIZES TWO SET TEMPERATURE RANGES

BACKGROUND OF THE INVENTION

1. Field of the Invention

The present invention relates to air-conditioning apparatuses and, more particularly, it relates to an air-conditioning apparatus that, without a sensor provided to detect the presence of an occupant in a room, provides variable control of the direction of an air blow vane or the air flow speed or air volume of a fan associated with heating operation according to the circumstances.

2. Description of the Related Art

Some known air-conditioning apparatuses perform control so as to set the air blow vane on the indoor unit air outlet to a downward direction or increase the air volume of the indoor unit fan if there is a high likelihood that there is no occupant in the room when a timer or home control is activated (see, for example, Japanese Unexamined Patent Application Publication No. 61-223448). This is intended to speed up a rise in room temperature during heating operation if there is no occupant in the room.

In contrast, indoor units of other apparatuses are provided with a sensor, such as an infrared sensor, for detecting the presence of an occupant and, if such a sensor detects that there is no occupant in the room, the other apparatuses perform control so as to set the air blow vane to a downward direction or increase the air volume of the fan (see, for example, Japanese Unexamined Patent Application Publications Nos. 2004-150731 and 2008-101874).

In particular, the air-conditioning apparatuses disclosed in Japanese Unexamined Patent Application Publications Nos. 2004-150731 and 2008-101874 are configured to set the air blow vane to a horizontal direction if there is an occupant in the room so that the occupant is not directly exposed to cold or warm wind, thereby giving comfort to the occupant.

However, an air-conditioning apparatus disclosed in Japanese Unexamined Patent Application Publication No. 61-223448 performs control so as to set the air blow vane to a downward direction or increase the air volume of the fan when a timer or home control is activated. For this reason, even if an occupant is actually present in the room, such an air-conditioning apparatus performs control so as to set the air blow vane to a downward direction or increase the air volume of the fan when a timer or home control is activated, which makes the occupant in the room uncomfortable.

In contrast, like air-conditioning apparatuses disclosed in Japanese Unexamined Patent Application Publications Nos. 2004-150731 and 2008-101874, a system provided with an infrared sensor for detecting the presence of an occupant in the room can exactly detect the presence of an occupant. However, such a system becomes costly due to the use of such an expensive infrared sensor. In addition, in order to provide a highly precise detection, an optimum sensor mounting position must be selected with keeping structural and design restrictions in mind, resulting in increased cost of the air-conditioning apparatus main unit itself.

SUMMARY OF THE INVENTION

The present invention has been achieved in light of the foregoing and a first object thereof is to provide an air-conditioning apparatus that allows warm air to efficiently extend around the room in order to create an easy-to-warm-up, comfortable air-conditioned room space in an energy-saving manner when an attempt is made to warm up the room with no occupant inside for the purpose of preventing a freeze-up in the house or building in cold areas.

A second object of the present invention is to provide an inexpensive air-conditioning apparatus without mounting expensive components like an infrared sensor.

The air-conditioning apparatus according to the present invention includes a temperature sensor for detecting a heat exchanger temperature or an inlet air temperature, a controller that performs variable control of the direction of the indoor unit air blow vane or the air flow speed or air volume of the blower fan in a remote control manner, and a remote controller that remote-controls indoor unit operation, wherein temperatures set via the remote controller are classified to two set temperature ranges and during heating operation the controller sets at least the air blow vane to a horizontal or downward direction on the basis of the two set temperature ranges and the heat exchanger temperature or the inlet air temperature.

The air-conditioning apparatus according to the present invention is configured to be able to detect the presence of an occupant in the room by dividing the temperatures set via the remote controller associated with heating operation into the two set temperature ranges, thereby providing an energy-saving, comfortable air-conditioning apparatus as an advantageous effect. Also, it eliminates the need of an expensive infrared sensor, thereby providing an inexpensive air-conditioning apparatus as another advantageous effect.

BRIEF DESCRIPTION OF THE DRAWINGS

FIG. 1 is a cross-sectional view of an air-conditioning apparatus according to Embodiment 1 of the present invention.

FIG. 2 is a bottom view of the air-conditioning apparatus of FIG. 1, as viewed from its bottom.

DESCRIPTION OF THE PREFERRED EMBODIMENTS

Embodiments according to the present invention will now be described below with reference to the attached figures, The embodiments will be described by way of an example of a ceiling-recessed type air-conditioning apparatus to be mounted onto a ceiling of a room, but not limited thereto. The present invention can be equally applied to a wall-hanging type air-conditioning apparatus to be mounted onto a wall surface.

Embodiment 1

Figure 3:
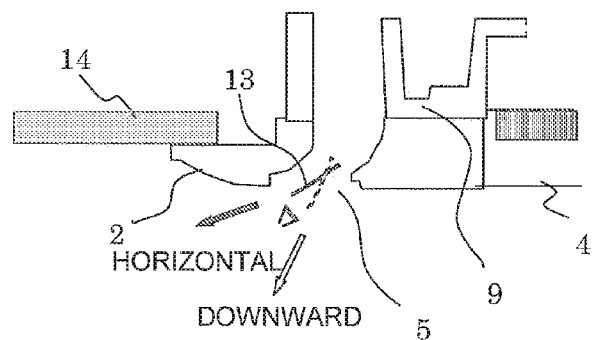
FIG. 3 is an expanded sectional view showing the cross section of an air outlet in the air-conditioning apparatus of FIG. 1.

FIG. 1 a cross-sectional view of an air-conditioning apparatus according to Embodiment 1 of the present invention. FIG. 2 is a bottom view of a ceiling-mounted air-conditioning apparatus of FIG. 1. FIG. 3 is an expanded sectional view showing the cross section of an air outlet in the ceiling-recessed type air-conditioning apparatus of FIG. 1. The arrows in FIG. 1 indicate the directions in which air flows.

The air-conditioning apparatus (indoor unit) 100 according to Embodiment 1 is mounted in a ceiling of a room and takes in indoor air through an inlet 4 formed in the middle of a decorative panel 2 of a main unit 1 and blows out the air (air-conditioned air) subjected to heat exchange into the room through outlets 5 provided in four directions in the decorative panel 2, thereby air-conditioning (heating or cooling) the room.

The main unit 1 includes of the decorative panel 2 embedded in a ceiling material 14 with no clearance therebetween and a casing 3 in which major air-conditioning components are housed. The main unit 1 includes, as the major air-conditioning components, a blower fan (for example, a turbo fan) 6, a fan motor 7 for driving the blower fan 6, a heat exchanger 8 that functions as a condenser during heating operation and functions as an evaporator during cooling operation, a drain pan 9 that receives drainage water dripping from the heat exchanger 8, and an electrical component container 10 that contains a microcomputer and a power supply circuit and the likes, including a controller to be described later for performing setting, control, and changes for the operation of the air-conditioning apparatus 100. The main unit 1 also includes a piping temperature sensor (heat exchanger temperature sensor) 11 for detecting the temperature of the heat exchanger 8 and an inlet air temperature sensor 12 for detecting the temperature of inlet air. Furthermore, each of the outlets 5 of the decorative panel 2 is provided with an air blow vane (air direction vane) 13 that can arbitrarily change an air blowing direction between horizontal and downward directions.

Next, the operation will be described below.

With this arrangement of the main unit 1 of the air-conditioning apparatus 100, indoor air taken in through the inlet 4 is subjected to heat exchange through the heat exchanger 8 and blown out through the outlet 5 into the room. At this time, the air blow vane 13 changes the air direction between horizontal and downward directions according to its vane angle.

The control operation associated with heating operation of the air-conditioning apparatus 100 is further described below in detail with reference to FIGS. 4 through 6.

Figure 4:
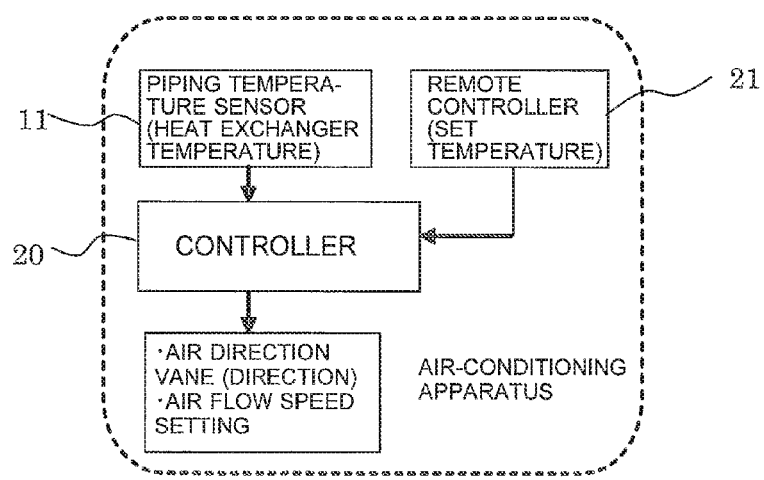
FIG. 4 is a block diagram showing the controller configuration of the air-conditioning apparatus according to Embodiment 1.
Figure 5:
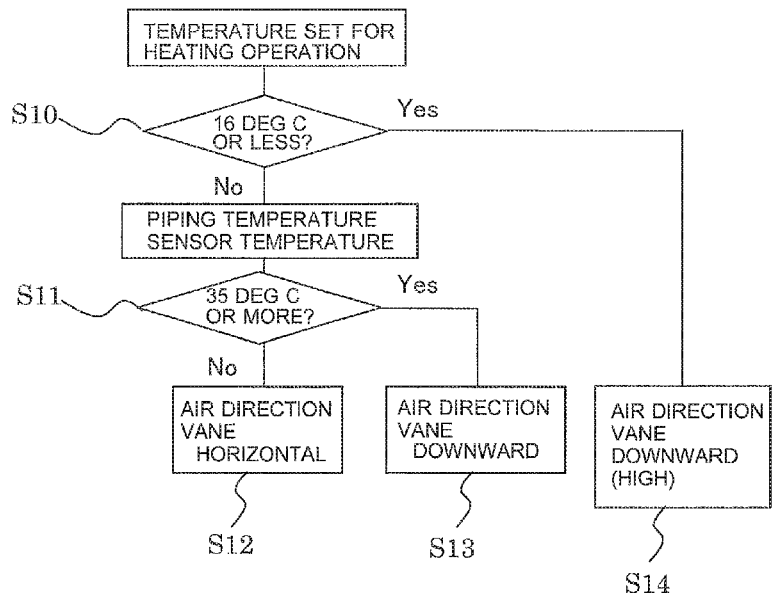
FIG. 5 is a flowchart showing the control operation associated with heating operation of the air-conditioning apparatus according to Embodiment 1.

FIG. 4 is a block diagram showing the configuration of a controller 20 in the air-conditioning apparatus 100. FIG. 5 is a flowchart showing the operation of the controller associated with heating operation of the air-conditioning apparatus 100. FIG. 6 is a diagram showing an example of a range of the temperatures set via a remote controller associated with heating operation of the air-conditioning apparatus 100.

As shown in FIG. 4, the controller 20 receives a temperature value (set temperature) set through the remote controller 21 and a temperature value of the heat exchanger 8 detected by the piping temperature sensor 11, and, on the basis of these temperature values, changes the direction of the air blow vane (air direction vane) 13 and the speed of the fan motor 7, thereby setting a flow speed (or air volume). The remote controller 21 is not limited to a hand-operable device which provides remote control of an indoor unit, but may also be an external input/output device, including a timer and a home control, which is installed indoor or is operable from outside. The inlet air temperature detected by the inlet air temperature sensor 12 may replace the temperature of the heat exchanger 8 detected by the piping temperature sensor 11.

Figure 6:
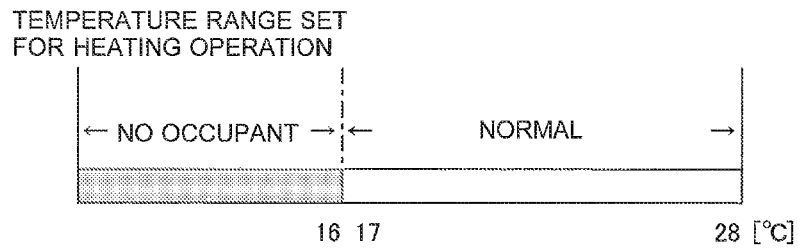
FIG. 6 is a diagram showing a range of temperatures set via a remote controller associated with heating operation of the air-conditioning apparatus according to Embodiment 1.

As shown in FIG. 6, generally temperatures set via the remote controller 21 fall within a range between 17 and 28 degrees C. as normal set temperatures for heating operation and fall within a range between 10 and 16 degrees C. as set temperatures when there is no occupant in the room. In other words, the temperatures set via the remote controller 21 are divided into two ranges. One of the ranges includes the higher normal set temperatures between 17 and 28 degrees C. This set temperature range assumes that there is a high likelihood of an occupant in the room (occupant present) and is thus referred to as a first set temperature range. The other set temperature range includes the lower set temperatures between 10 and 16 degrees C., This set temperature range assumes that there is a high likelihood of no occupant in the room (no occupant present or absent) and thus is referred to as a second set temperature range.

The control operation associated with heating operation of the air-conditioning apparatus 100 is described below with reference to the flowchart shown in FIG. 5, During heating operation, a determination is made in step S10 as to whether a temperature set via the remote controller 21 is not more than 16 degrees C. If the temperature is more than 16 degrees C., there is a high likelihood of an occupant in the room. Then, a determination is made as to whether a temperature of the heat exchanger 8 detected by the piping temperature sensor 11 is not less than 35 degrees C. (step S11). The temperature of 35 degrees C. indicates the temperature of the heat exchanger that is performing normal heating operation. On the basis of the determination made in step 11, if the heat exchanger temperature is less than 35 degrees C., the controller 20 sets the air blow vane (air direction vane) 13 to a horizontal direction, thereby preventing air-conditioned air from being blown directly onto an occupant until the heat exchanger 8 becomes warmer (step S12). In contrast, if the heat exchanger temperature is found to be not less than 35 degrees C. in step S11, the controller 20 sets the air blow vane (air direction vane) 13 to a downward direction, thereby allowing warm air-conditioned air to be blown down toward the feet of an occupant (step S13).

In other words, if a temperature set via the remote controller 21 falls within the higher range (between 17 and 28 degrees C.), it is determined that an occupant is present and thus normal heating operation is to be performed. If the temperature of the heat exchanger 8 detected by the piping temperature sensor 11 is found to be not more than 35 degrees C., the air blow vane 13 is set to a horizontal direction, thereby preventing an occupant from being exposed to cold air. In contrast, if the temperature of the heat exchanger 8 detected by the piping temperature sensor 11 is found to be more than 35 degrees C., the air blow vane 13 is set to a downward direction in such a manner that warm air is blown down to the feet of an occupant, thereby efficiently heating the room.

If a temperature set via the remote controller 21 is found in step S10 to fall within the lower range (between 10 and 16 degrees C.), it is determined that no occupant is present and thus a non-occupant heating operation is to be performed. As a result, regardless the temperature of the heat exchanger 8 detected by the piping temperature sensor 11, the air blow vane 13 is set to a downward direction or the blower fan 6 is set to run at a high speed mode for strong blowing so that warm air is blown down to the floor surface, thereby efficiently heating the room (step S14). As described above, it is determined that the non-occupant heating operation is to be performed if the temperature set via the remote controller 21 is found to fall within the lower range (between 10 and 16 degrees C.). However, if an occupant is present in spite of the above determination and feels cold when exposed to the air, he/she can manually change the set temperature or the air direction via the remote controller 21, thereby cancelling the non-occupant heating operation.

As described above, the temperatures set via the remote controller 21 are classified to two temperature ranges in Embodiment 1, thereby allowing the controller 20 to determine whether or not an occupant is present in the room. On the basis of the determination, the controller 20 causes the main unit 1 side to control the direction of the air blow vane 13 so as to prevent an occupant from feeling cold when the occupant is present in the room, or so as to provide efficient heating operation when no occupant is in the room, thereby improving uneven temperature distribution and energy saving and as a result providing an inexpensive air conditioning apparatus.

Embodiment 2

Figure 7:
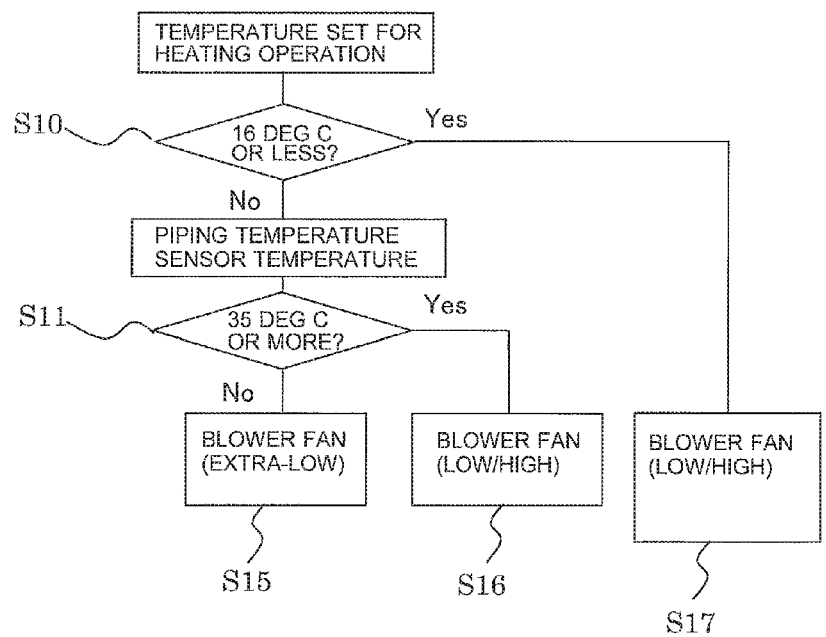
FIG. 7 is a flowchart showing the control operation associated with heating operation of the air-conditioning apparatus according to Embodiment 1.

In Embodiment 2, the speed of the blower fan 6 is mainly controlled according to a temperature set via the remote controller 21 although the direction of the aft blow vane 13 is changed according to the temperature set via the remote controller 21 in Embodiment 1. Embodiment 2 is described below with reference to the flowchart of FIG. 7. FIG. 7 is a flowchart showing the control operation associated with heating operation of the air-conditioning apparatus according to Embodiment 1 of the present invention, which is basically the same as those of FIG. 5. The configuration of the controller 20 according to Embodiment 2 is the same as that of FIG. 4.

If a temperature set via the remote controller 21 falls within the higher range (between 17 and 28 degrees C.), it is determined that an occupant is present and thus normal heating operation is to be performed. If the temperature of the heat exchanger 8 detected by the piping temperature sensor 11 is found to be not more than 35 degrees C., the fan speed is set to the extra low level (step 515), thereby preventing an occupant from feeling cold. If the temperature of the heat exchanger 8 detected by the piping temperature sensor 11 is found to be more than 35 degrees C., the fan speed is set to a level (low or high level) set via the remote controller 21 (step S16) so as to allow more amount of warm air to be distributed around the room, thereby efficiently heating the room. If a temperature set via the remote controller 21 is found to fall within the lower range (between 10 and 16 degrees C.), it is determined that no occupant is present and thus non-occupant heating operation is to be performed. As a result, regardless the temperature of the heat exchanger 8 detected by the piping temperature sensor 11, the fan speed is set to a level (low or high level) set via the remote controller (step S17) so as to allow more amount of warm air to be distributed around the room, thereby efficiently heating the room. As described above, it is determined that non-occupant heating operation is to be performed if the temperature set via the remote controller 21 is found to fall within the lower range (between 10 and 16 degrees C.). However, if an occupant is actually present in spite of the above determination and feels cold when exposed to the air, he/she can manually change the fan speed setting via the remote controller 21, thereby cancelling the non-occupant heating operation.

As described above, the temperatures set via the remote controller 21 are classified to two set temperature ranges in Embodiment 2, thereby allowing the controller 20 to determine whether or not an occupant is present in the room. On the basis of the determination, the controller 20 causes the main unit 1 to control the speed of the blower fan 6 so as to prevent an occupant from feeling cold when he/she is present in the room or provide efficient heating operation when no occupant is in the room, thereby improving uneven temperature distribution and energy saving and as a result providing an inexpensive air conditioning apparatus.

REFERENCE SIGNS LIST

1 Main unit
2 Decorative panel
3 Casing
4 Inlet
5 Outlet
6 Blower fan
7 Fan motor
8 Heat exchanger
9 Drain pan
10 Electrical component container
11 Piping temperature sensor
12 Inlet air temperature sensor
13 Air blow vane
14 Ceiling material
20 Controller
21 Remote controller
100 Air conditioning apparatus

What is claimed is:

1. An air-conditioning apparatus comprising: a temperature sensor that detects a temperature of a heat exchanger or a temperature of inlet air;
   a main controller that is configured to perform variable control of a direction of an air blow vane, an air flow speed, or air volume of a blower fan in an indoor unit; and
   a remote controller that remote-controls operation of the indoor unit, wherein temperatures set via the remote controller are classified into two set temperature ranges including a lower set temperature range and a higher set temperature range that is a range higher than the lower set temperature range; and
   the main controller is configured to set at least the air blow vane to a horizontal or downward direction on the basis of which of the two set temperature ranges a temperature set by the remote controller falls within and a temperature of either the heat exchanger or inlet air at the time of heating operation;
   the main controller is configured to set the air blow vane to a horizontal direction when the temperature of the heat exchanger is lower than a predetermined temperature and the temperature that is inputted by the remote controller falls within the higher set temperature range;
   the main controller is configured to set the air blow vane to a downward direction when the temperature of the heat exchanger is greater than or equal to the predetermined temperature and the temperature that is inputted by the remote controller falls within the higher set temperature range;
   the main controller is configured to set the air blow vane to a downward direction or set an air flow speed of the blower fan to a high level, regardless of the temperature of the heat exchanger when the temperature that is inputted by the remote controller falls within the lower set temperature range.

2. The air-conditioning apparatus of claim 1, wherein the main controller is configured to determine whether or not an occupant is in a room based upon which of the two set temperature ranges a temperature value set by the remote controller falls within, and controls a direction of an air blow vane or an air flow speed or air volume of a blower fan on the basis of the determination.

3. The air-conditioning apparatus of claim 1,
   wherein an air flow speed or air volume of a blower fan can be manually changed by the remote controller.

4. The air-conditioning apparatus of claim 1, wherein the lower set temperature range is between 10° and 16° C.

5. The air-conditioning apparatus of claim 4, wherein the higher set temperature range is between 17° and 28° C.

\* \* \* \* \*